(12) United States Patent
Goris et al.

(10) Patent No.: US 10,303,704 B2
(45) Date of Patent: May 28, 2019

(54) PROCESSING A DATA SET THAT IS NOT ORGANIZED ACCORDING TO A SCHEMA BEING USED FOR ORGANIZING DATA

(71) Applicant: Oracle International Corporation, Redwood Shores, CA (US)

(72) Inventors: Rob Goris, Barcelona (ES); Yu Jun Lam, Folsom, CA (US); Yongran Huang, San Jose, CA (US); Peter Ondrejka, Dunakeszi (HU); Pradeep Prabhakar Kinjawadekar, Fremont, CA (US); Kit Sum Belinda Chan-Most, Newark, CA (US); Kyle I. Parent, San Mateo, CA (US); Paolo Juvara, San Francisco, CA (US); Laszlo Nyakas, Szigethalom (HU)

(73) Assignee: Oracle International Corporation, Redwood Shores, CA (US)

( * ) Notice: Subject to any disclaimer, the term of this patent is extended or adjusted under 35 U.S.C. 154(b) by 512 days.

(21) Appl. No.: 15/051,296

(22) Filed: Feb. 23, 2016

(65) Prior Publication Data

US 2017/0242907 A1 Aug. 24, 2017

(51) Int. Cl.
*G06F 7/02* (2006.01)
*G06F 16/00* (2019.01)
*G06F 16/28* (2019.01)
*G06F 16/2455* (2019.01)
(Continued)

(52) U.S. Cl.
CPC .......... *G06F 16/285* (2019.01); *G06F 16/211* (2019.01); *G06F 16/213* (2019.01); *G06F 16/2455* (2019.01); *G06F 16/334* (2019.01); *G06F 16/3349* (2019.01)

(58) Field of Classification Search
CPC ......... G06F 17/30598; G06F 17/30477; G06F 17/30292; G06F 17/30297; G06F 17/30675; G06F 17/30693; G06F 16/285; G06F 16/2455; G06F 16/211; G06F 16/213; G06F 16/334; G06F 16/3349
See application file for complete search history.

(56) References Cited

U.S. PATENT DOCUMENTS

| 8,751,486 | B1 | 6/2014 | Neeman et al. | |
| 9,122,746 | B2 | 9/2015 | Neeman et al. | |
| 9,262,390 | B2 * | 2/2016 | Edala | G06F 17/241 |

(Continued)

*Primary Examiner* — Bruce M Moser
(74) *Attorney, Agent, or Firm* — Invoke

(57) ABSTRACT

Techniques are disclosed for processing a data set that is not organized according to a schema being used for organizing data (referred to herein as an "unstructured data set"). An unstructured data set is analyzed based on a group of structured data sets that are organized according to the schema. A particular structured data set is determined to be associated with the unstructured data set. The unstructured data set is stored in association with the particular structured data set. Periodically, the unstructured data set is re-analyzed based on a current version of the group of structured data sets. Additionally or alternatively, an unstructured data set is analyzed based on a particular schema of a set of schemas. A subset of information is extracted from the unstructured data set, and stored in accordance with the particular schema. Periodically, the unstructured data set is re-analyzed based on a current version of the set of schemas.

19 Claims, 8 Drawing Sheets

(51) Int. Cl.
*G06F 16/21* (2019.01)
*G06F 16/33* (2019.01)

(56) References Cited

U.S. PATENT DOCUMENTS

| | | | |
|---|---|---|---|
| 9,280,568 B2 | 3/2016 | Mccaffrey | |
| 9,594,828 B2 | 3/2017 | Neeman et al. | |
| 9,654,510 B1* | 5/2017 | Pillai | H04L 63/1416 |
| 9,916,379 B2 | 3/2018 | Neeman et al. | |
| 2006/0277224 A1* | 12/2006 | Aftab | G06F 17/30575 |
| 2009/0319514 A1* | 12/2009 | Gouttas | G06F 16/35 |
| 2012/0117120 A1* | 5/2012 | Jacobson | G06F 17/30557 707/793 |
| 2016/0048499 A1* | 2/2016 | Deshmukh | G06F 16/20 704/9 |

* cited by examiner

PROCESSING A DATA SET THAT IS NOT ORGANIZED ACCORDING TO A SCHEMA BEING USED FOR ORGANIZING DATA

BACKGROUND

Information is generally captured in data sets in varying forms. Some data sets are captured using specific interface components (e.g., text boxes, dropdown menus, toggles) that map to data fields within a schema. Other data sets are captured using a free form that do not directly map to any data fields within a schema. As an example, a word processing document may include notes from a meeting in free form text. The free form text may include (a) portions that correspond to a data field within a schema being used for organizing data and (b) portions that do not correspond to any data field within the schema.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
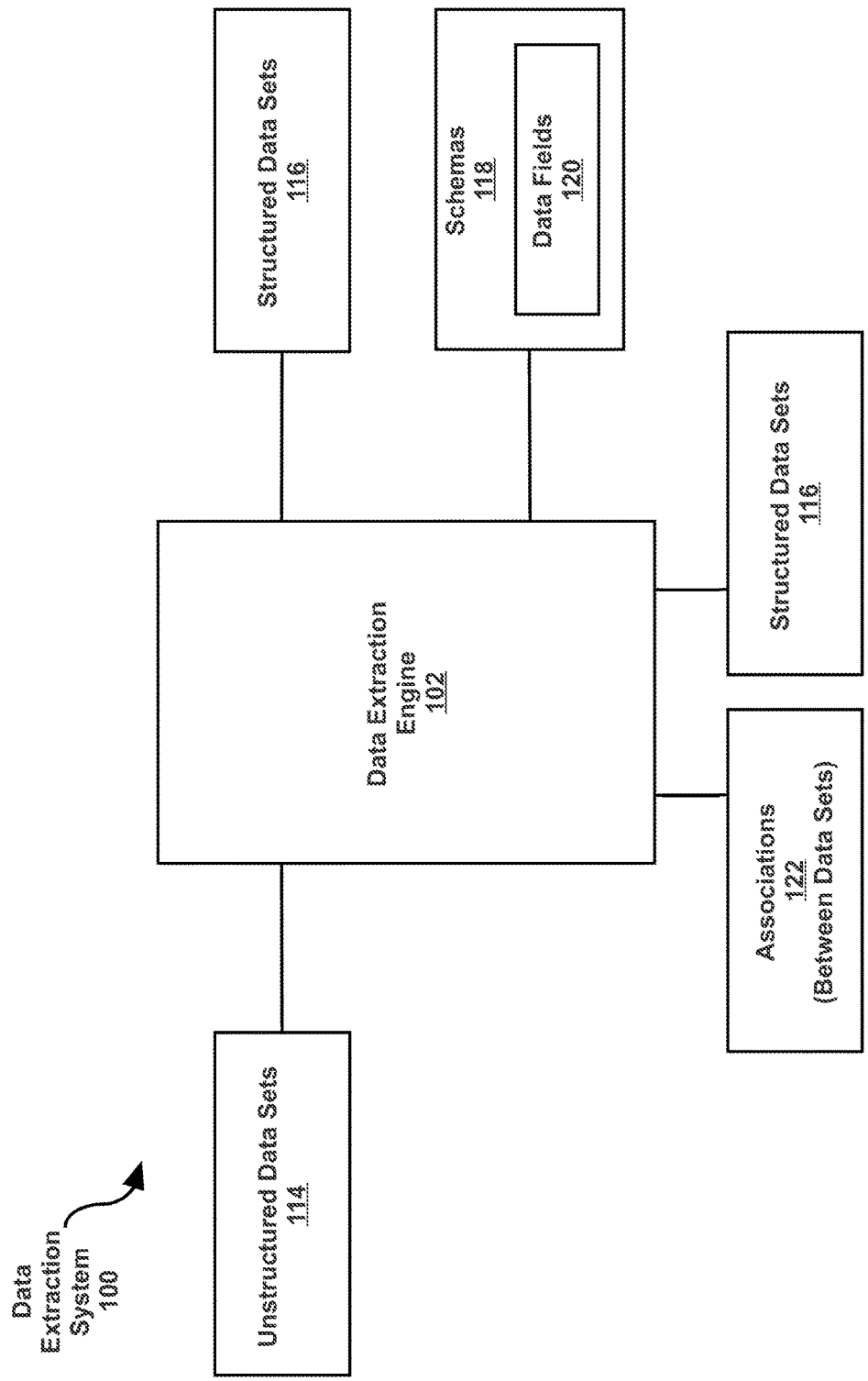
FIG. 1A illustrates a data extraction system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DATA EXTRACTION SYSTEM ARCHITECTURE
3. ANALYZING AN UNSTRUCTURED DATA SET BASED ON A GROUP OF STRUCTURED DATA SETS
4. ANALYZING AN UNSTRUCTURED DATA SET BASED ON ONE OR MORE SCHEMAS
5. MISCELLANEOUS; EXTENSIONS
6. HARDWARE OVERVIEW

1. General Overview

One or more embodiments include storing an association between (a) a data set that is organized according to a particular schema ("structured data set") and (b) another data set that is not organized according to that particular schema ("unstructured data set"). The unstructured data set is analyzed based on the structured data sets. Based on the analysis, at least one of the structured data sets is determined to be associated with the unstructured data set. The unstructured data set is stored in association with the structured data set that is determined to be associated with the unstructured data set. An interface may concurrently display the unstructured data set and the associated structured data set. The concurrent display allows a user to easily identify one or more structured data sets that are associated with the unstructured data set.

One or more embodiments include reanalyzing an unstructured data set in response to a modification of the structured data sets. As an example, an unstructured data set is initially analyzed based on a group of structured data sets. A particular structured data set is determined to be associated with the unstructured data set. The unstructured data set is stored in association with the particular structured data set. Subsequently, a system modifies the group of structured data sets. As an example, one of the existing structured data sets may be modified and/or a new structured data set may be added to the group of structured data sets. The unstructured data set is re-analyzed based on the one or more structured data sets that have been modified and/or added. Based on the re-analyzing operation, an additional structured data set is determined to be associated with the unstructured data set. The system adds an association between the unstructured data set and the additional structured data set.

One or more embodiments include generating a structured data set based on at least a subset of information extracted from an unstructured data set. An unstructured data set is analyzed based on a particular schema. Based on the analysis, at least a subset of information is extracted from the unstructured data set. The subset of the unstructured data set is stored, as a structured data set, in accordance with the particular schema. Additionally, the unstructured data set may be stored in association with the structured data set corresponding to the subset of the unstructured data set.

One or more embodiments include updating the structured data sets that are generated from an unstructured data set that is maintained by a system. Initially, an unstructured data set is analyzed based on a set of one or more schemas to extract a structured data set corresponding to at least a subset of the unstructured data set. In addition to the structured data set, a system stores the unstructured data set. Subsequent to generating the structured data set, the set of schemas may be modified. As an example, one of the existing schemas may be modified and/or a new schema may be added to the set of schemas. The unstructured data set is re-analyzed based at least on one or more schemas that have been modified and/or added. Based on the re-analyzing operation, another subset of the unstructured data set may be extracted as an additional structured data set. The additional structured data set is stored in accordance with the modified schema and/or new schema. The additional structured data set may be stored instead of or in addition to the initial structured data set.

2. Data Extraction System Architecture

FIG. 1A illustrates a data extraction system 100 in accordance with one or more embodiments. As illustrated in FIG. 1A, data extraction system 100 includes a data extraction engine 102. Data extraction system 100 also includes information describing one or more unstructured data sets 114, one or more structured data sets 116, one or more schemas 118, and one or more associations 122 between data sets. This information may be stored across one or more data repositories (not shown). A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as data extraction engine 102. Alternatively or additionally, a data repository may be implemented or executed on a separate computing system than data extraction engine 102. A data repository may be communicatively coupled to data extraction engine 102 via a direct connection or via a network.

Data extraction system 100 may include more or fewer components than the components illustrated in FIG. 1A. The components illustrated in FIG. 1A may be local to or remote from each other. The components illustrated in FIG. 1A may be implemented in software and/or hardware and may be distributed over one or more applications and/or machines. Operations described with respect to one component may instead be performed by another component.

In one or more embodiments, a schema 118 refers to a particular organization of a structured data set 116. A schema 118 uses one or more data fields 120 to organize the information of a structured data set 116. A schema 118 may specify the names of data fields 120, the data types of data fields 120, the number of data fields 120 in the schema 118, and/or the number of tables in the schema 118.

A data field 120 is an attribute that is common to the information stored in a group of structured data sets 116. As an example, a group of structured data sets may store the personal information of a user's contact persons. Each contact person may have a name and telephone number. The name and telephone number would be examples of attributes that are common to the information stored in the structured data sets. "Name" and "Telephone Number" may be data fields for the structured data sets. Examples of data fields 120 include headings of a table, and/or data labels of a data object.

Different schemas 118 may be used by one or more applications (not shown). One application may be configured to process, interpret, and/or manipulate information that is organized according to one schema, while another application may be configured to process, interpret, and/or manipulate information that is organized according to another schema. An application may be implemented or may execute on the same computing system as data extraction engine 102. Alternatively or additionally, an application may be implemented or executed on a computing system separate from data extraction engine 102. An application may be communicatively coupled to data extraction engine 102 via a direct connection or via a network.

In one or more embodiments, a structured data set 116 refers to a collection of data that is organized according to a particular schema (e.g., one of schemas 118) being used for storing data. A portion of a structured data set 116 that is stored under a particular data field 120 of a schema 118 is referred to herein as an "element." Structured data sets 116 may be accessed by one or more applications that process information organized according to a schema, as described above.

Figure 1B:
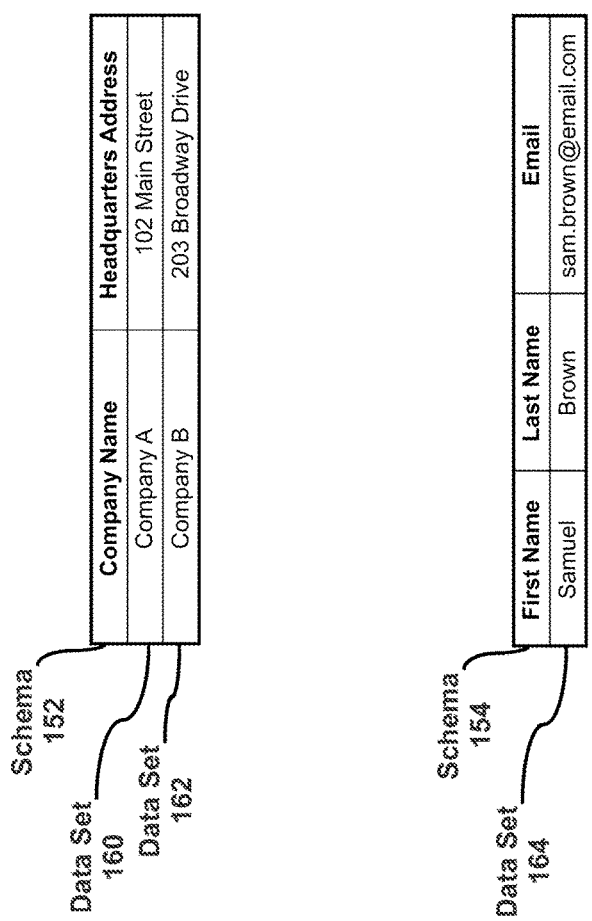
FIG. 1B illustrates examples of schemas and structured data sets, in accordance with one or more embodiments.

Referring to FIG. 1B, data sets 160-164 are examples of structured data sets organized according to different schemas. Data sets 160-162, corresponding to company information, may be organized according to schema 152. Schema 152 may include data fields such as "Company Name" and "Headquarters Address." Data set 160 may include an element "Company A" under the data field "Company Name," and another element "102 Main Street" under the data field "Headquarters Address." Data set 162 may include an element "Company B" under the data field "Company Name," and another element "203 Broadway Drive" under the data field "Headquarters Address."

Data set 164, corresponding to contact information, may be organized according to schema 154. Schema 154 may include data fields such as "First Name," "Last Name," and "Email." Data set 164 may include an element "Samuel" under the data field "First Name," another element "Brown" under the data field "Last Name," and another element "sam.brown@email.com" under the data field "Email."

In one or more embodiments, an unstructured data set 114 refers to a collection of data that is not organized according to any of a set of one or more schemas 118 being used by a system to organize data. Unstructured data set 114 might lack delimiters, tags, or other forms of metadata that are usable to segregate the data into separate or identifiable data fields 120. Additionally or alternatively, data within unstructured data set 114 might not follow any patterns that are usable to segregate the data into separate or identifiable data fields 120. Examples of unstructured data set 114 include but are not limited to paragraphs of text, an audio stream, and a video stream.

An unstructured data set 114 may refer to a data set that is organized according to a schema that is not within a particular set of schemas 118 being used by a system to organize data. An unstructured data set 114 may refer to a spreadsheet which is organized according to a schema that not used by a particular system to organize data. As an example, a spreadsheet may store a person's contacts. The spreadsheet may include one column labeled "Name," and another column labeled "Address." The column labels would constitute a schema for the spreadsheet, specifying the data fields "Name" and "Address." However, the schema for the spreadsheet may not be within a particular set of schemas used by a system to organize data. The schema, used by the system to organize data, may include the data fields "First Name," "Last Name," "Street Address," and "State."

As another example, a note file may include a summary of a meeting. The note file may include text under a data field named "Notes." The note file may also store the date on which the note file was created under a data field named "Creation Date." The data fields "Notes" and "Creation Date" would constitute a schema. However, the schema may not be within a particular set of schemas used by a system to organize data.

In one or more embodiments, an association 122 between data sets is a relationship between the data sets. An association 122 may be (a) an association between an unstructured data set 114 and a structured data set 116, and/or (b) an association between two structured data sets 116. Associations 122 may be stored in a variety of formats. As some examples, associations 122 may be stored in a table, with one column including an identification of one data set and another column including an identification of an associated data set. Associations 122 may be stored in a linked list, with one node including an identification of one data set and another node including an identification of an associated data set. Associations 122 may be stored in an array, with one array element including an identification of one data set and another array element including an identification of an associated data set. An association may refer to a pointer and/or identifier stored with a data set and referencing another associated data set. As an example, a structured data set may include a field including identifiers corresponding to unstructured data sets. An association between data sets may be implied based on a relationship between data structures that include the data sets.

In one or more embodiments, data extraction engine 102 refers to hardware and/or software configured to perform operations described herein for processing an unstructured data set 114. Examples of operations for analyzing an unstructured data set 114 based on a group of structured data sets 116 are described below with reference to FIG. 2. Examples of operations for analyzing an unstructured data set 114 based on a particular schema 118 are described below with reference to FIG. 4.

In an embodiment, data extraction engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and/or a personal digital assistant ("PDA").

3. Analyzing an Unstructured Data Set Based on a Group of Structured Data Sets

Figure 2:
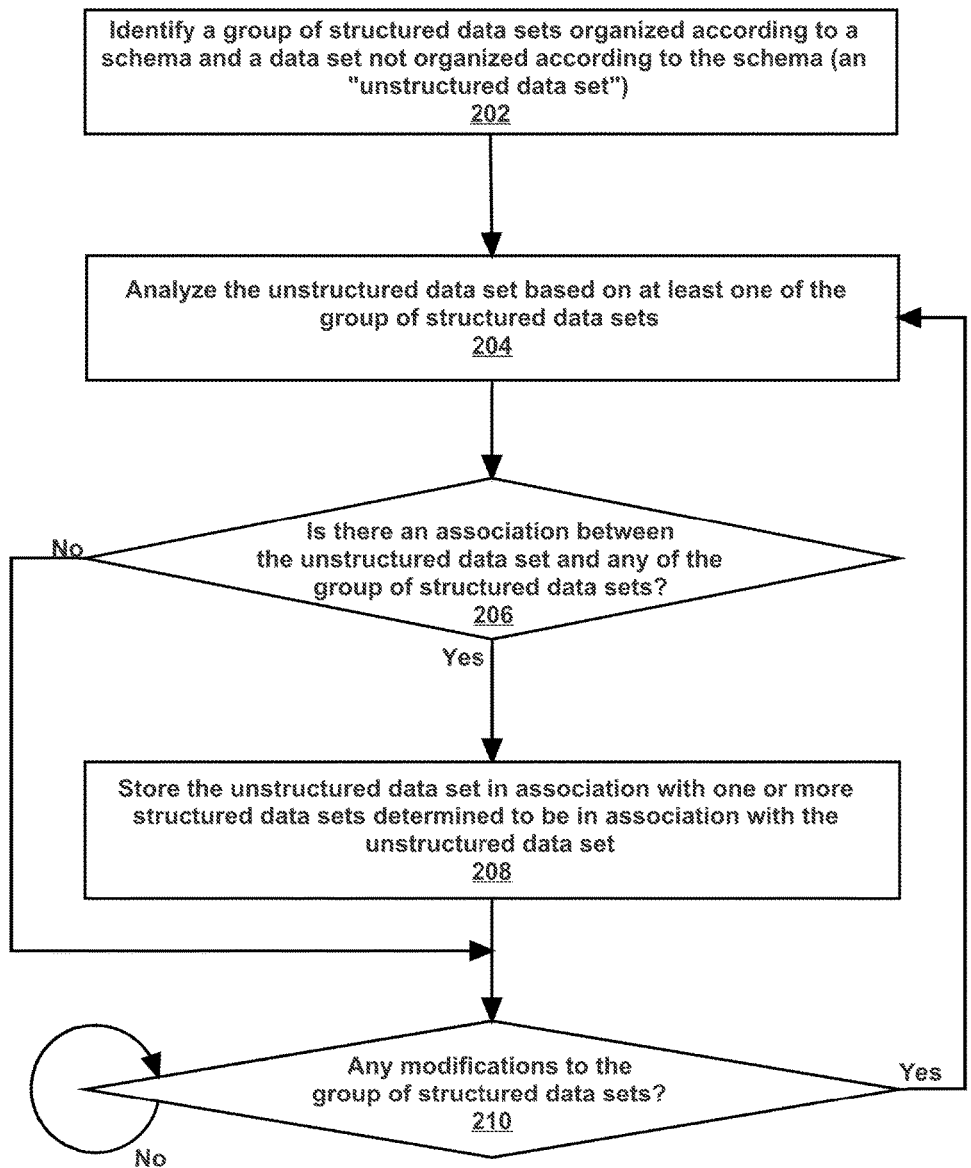
FIG. 2 illustrates an example set of operations for analyzing a particular data set that is not organized according to a particular schema based on a group of structured data sets, in accordance with one or more embodiments.

As mentioned above, in an embodiment, a data extraction engine is configured to perform operations for analyzing an unstructured data set based on a group of structured data sets. FIG. 2 illustrates an example set of operations for analyzing an unstructured data set based on a group of structured data sets, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments include identifying a group of structured data sets organized according to a particular schema and a data set not organized according to the particular schema (also referred to herein as an "unstructured data set") (Operation 202). A data extraction engine obtains the structured data sets from one or more data repositories that are maintained by the data extraction engine and/or one or more other applications. The data extraction engine may receive the structured data sets from an application. Additionally or alternatively, the data extraction engine may retrieve the structured data sets from a data repository maintained by an application. The data extraction engine accesses the structured data sets using a communications protocol, such as Hypertext Transfer Protocol (HTTP), over wired and/or wireless communications.

The data extraction engine may obtain structured data sets organized according to different schemas from data repositories maintained by different applications. As an example, a Contacts Application may maintain a database of contact information. The Contacts Application may store a group of structured data sets, each corresponding to information of a contact, in a data repository. A Sales Application may maintain a database of sales information. The Sales Application may store a group of structured data sets, each corresponding to information of a sales transaction, in a data repository. A data extraction engine may access the data repository of the Contacts Application and the data repository of the Sales Application to obtain the structured data sets.

The data extraction engine obtains the unstructured data set from one or more data repositories that are maintained by the data extraction engine and/or one or more other applications. The data extraction engine may receive user input comprising an unstructured data set via an interface. The data extraction engine may store the unstructured data set in a data repository and subsequently may access the unstructured data set from the data repository. Additionally or alternatively, the data extraction engine may receive the unstructured data set from an application. Additionally or alternatively, the data extraction engine may retrieve the unstructured data set from a data repository maintained by an application.

As an example, the data extraction engine may implement an interface for receiving notes from a user. The interface may receive user input comprising paragraphs of text, summarizing the discussions at a particular meeting. The data extraction engine may generate an unstructured data set, storing the paragraphs of text. The data extraction engine may store the unstructured data set in a data repository. Subsequently, the data extraction engine may obtain the unstructured data set from the data repository.

One or more embodiments include analyzing the unstructured data set based on at least one of the group of structured data sets (Operation 204). The data extraction engine compares the unstructured data set to one or more of the group of structured data sets.

The data extraction engine may identify one or more elements of a structured data set for comparison against the unstructured data set. The data extraction engine may identify elements of all data fields of the structured data set, or elements of a subset of data fields of the structured data set. As an example, a structured data set for storing personal information may use the data fields "Name" and "Birthday." The structured data set may store "John Smith" under "Name" and "Jan. 1, 1950" under "Birthday." An unstructured data set may include notes from a meeting. The element stored under "Name" ("John Smith") may be identified for comparison against the unstructured data set. The element stored under "Birthday" ("Jan. 1, 1950") might not be identified for comparison against the unstructured data set. A data extraction engine does not compare the element stored under "Birthday" against the unstructured data set because the likelihood that a birthday is mentioned in the meeting notes is low. Additionally or alternatively, the data extraction engine does not compare the element stored under "Birthday" against the unstructured data set because the relevancy of a birthday to the meeting notes is low.

The data extraction engine may perform natural language processing on the unstructured data set in order to compare the unstructured data set with the elements of the structured data set. The data extraction engine identifies terms of the unstructured data set to be compared to the elements of the structured data set by performing tokenization and parsing. The data extraction engine tokenizes the text that is stored in the unstructured data set. Tokenization partitions a stream of text into words, phrases, symbols, or other meaningful elements called tokens. The data extraction engine parses the tokens to identify relationships between the tokens based on sentence structure, the sequence of tokens in the text, the grammar used in the text, and other textual information. Based on the tokenization and/or parsing, the data extraction engine identifies a root of a word, identifies a synonym of a word, disambiguates a meaning of a word, discards stop words (which are words with little semantic content, such as articles like "a" and "the"), or otherwise interprets the text. Terms of the unstructured data set to be compared to the elements of the structured data set include the tokens, the roots of words, and the synonyms of words, and exclude stop words. As an example, a text may include the sentence, "I met with Emily Wong today." A data extraction engine may identify the terms "met" and "meet" for comparison to elements of a structured data set, because "meet" is a root word of "met." The data extraction engine may also identify the terms "I," "Emily," and "Wong" for comparison to the elements of a structured data set. However, the data extraction engine may exclude the term "with" because "with" is a stop word. "With" is a stop word because "with" occurs with a high frequency in the English language and has little semantic content.

The data extraction engine may compare each term of the unstructured data set against each element of the structured data set. Alternatively, the data extraction engine may compare a subset of terms of the unstructured data set against a subset of elements of the structured data set. For example, in the example discussed above, the data extraction engine may compare each consecutive pair of words against an element of a structured data set including: "I met", "met with", "with Emily", "Emily Wong", and "Wong today".

The data extraction engine may determine whether to perform a comparison of a particular term of the unstructured data set against a particular element of the structured data set based on (a) the data fields of the structured data set and (b) the data fields of the unstructured data set (if any data fields are used in the unstructured data set). The data extraction engine determines whether there is a match between a data field of the structured data set and a data field of the unstructured data set. The data extraction engine compares the particular information stored under a data field of the unstructured data set only against the element stored under the matching data field of the structured data set, without comparing the particular information against other elements of the structured data set.

As an example, a spreadsheet may store "Emily" under a column label "First Name." A group of structured data sets may have the data fields "Name" and "Telephone Number." A data extraction engine may determine that the column label "First Name" of the spreadsheet matches the data field "Name" of the structured data set. The data extraction engine may analyze the unstructured data set based on a first structured data set of the group of structured data sets. The analysis includes comparing the information stored under "First Name" ("Emily") against only the element of the first structured data set stored under "Name." The analysis does not include comparing the information stored under "First Name" ("Emily") against the element of the first structured data set stored under "Telephone Number." The data extraction engine may analyze the unstructured data set based on a second structured data set of the group of structured data sets. The analysis includes comparing the information stored under "First Name" ("Emily") against only the element of the second structured data set stored under "Name." The analysis does not include comparing the information stored under "First Name" ("Emily") against the element of the second structured data set stored under "Telephone Number."

One or more embodiments include determining whether there is an association between the unstructured data set and any of the group of structured data sets (Operation 206). The data extraction engine identifies an association between the unstructured data set and any of the structured data sets if there is a match between one or more terms of the unstructured data set and one or more elements of a particular structured data set. A match is found if the term and the element are the same. Alternatively, a match is found if the term and the element have a similarity score that is above a specified threshold.

A similarity score may be a string similarity metric that is computed using one or more techniques that are well known in the art. An example of a string similarity metric is the Levenshtein distance. The Levenshtein distance between two terms (or strings) is the minimum number of single-character edits (that is, insertions, deletions, or substitutions) required to change one word into the other. Other examples of string similarity metrics include Damerau-Levenshtein distance, longest common subsequence (LCS) metric, and Jaro-Winkler distance.

Additionally or alternatively, a similarity score may be a semantic similarity metric that is computed using one or more techniques that are well known in the art. A semantic similarity metric between two terms is a measure of the similarity between the meaning or semantic content of the two terms, as opposed to the similarity between the syntactical representation (string format) of the two terms. Examples of techniques for computing semantic similarity metrics include latent semantic analysis (LSA), pointwise mutual information (PMI) techniques, and machine-learning and/or statistical techniques.

If there is a match between a term of the unstructured data set and an element of a particular structured data set, then the data extraction engine determines that there is an association between the unstructured data set and the particular structured data set.

As an example, an unstructured data set may include the sentence, "I met with Diana Amber, of Hardware Co., at the Sales Database Conference." A structured data set may include the element "Diana Anber" under the data field "Name," and the element "Hardware Co." under the data field "Company." A data extraction engine may identify the elements "Diana Anber" and "Hardware Co." from the structured data set. The data extraction engine may identify terms such as "Diana Amber," "Hardware Co.," and "Sales Database Conference." As an example, "Diana Amber" may be selected responsive to determining that "Diana" and/or "Amber" matches entries in a database of names. The data extraction engine may compare the term "Diana Amber" against the element "Diana Anber." The data extraction engine may compute a similarity score between the term and the element to be 0.9. The data extraction engine may determine that the similarity score of 0.9 is above a specified threshold of 0.7. Even though there may have been a typographical error in the unstructured data set, the data extraction engine may determine a match between the term and the element. Based on the match between the term and the element, the data extraction engine may determine an association between the unstructured data set and the structured data set.

In an embodiment, if a similarity score between a term of the unstructured data set and an element of the particular structured data set is within a specified range, then the data extraction engine presents a request at a user interface for a user to confirm whether there is an association between the unstructured data set and the particular structured data set. If user input confirms that there is an association, then the data extraction engine determines that there is an association between the unstructured data set and the particular structured data set. However, if the similarity score between the term of the unstructured data set and the element of the particular structured data set is above the upper limit of the specified range, then the data extraction engine determines that there is an association between the unstructured data set and the particular structured data set without receiving user confirmation.

After determining that there is an association between the unstructured data set and an initial structured data set, the data extraction engine may further determine whether the initial structured data set is associated with any other structured data sets. The data extraction engine may determine that the initial structured data set is associated with an additional structured data set. The initial structured data set and the additional structured data set may be organized according to the same or different schemas. The unstructured data set is not organized according to any schema that is used to organize the initial structured data set and/or the additional structured data set. Based on the association between initial structured data set and the additional structured data set, the data extraction engine stores an association between the unstructured data set and the additional structured data set.

As an example, an unstructured data set may include the sentence, "I met with Diana Amber at the Sales Database Conference last Monday." A contact structured data set, organized using a contact schema, may include the element "Diana Amber" under the data field "Name." A company structured data set, organized using a company schema, may include the element "Hardware Co." under the data field "Company Name." The contact structured data set may have been previously stored in association with the company structured data set. The association may indicate that a relationship exists between the contact "Diana Amber" and the company "Hardware Co." (for example, Diana Amber is an employee of Hardware Co.). A data extraction engine may determine a match between (a) the term "Diana Amber" of the unstructured data set, and (b) the element "Diana Amber" of the contact structured data set. The data organization may determine that there is an association between the unstructured data set and the contact structured data set. Further, the data extraction engine may determine that the contact structured data set is associated with the company structured data set. The data extraction engine may determine that there is an association between the unstructured data set and the company structured data set. The association between the unstructured data set and the company structured data set is found even though the term "Hardware Co." does not appear in the unstructured data set.

If there is an association between the unstructured data set and one or more structured data sets, then the data extraction engine stores the unstructured data set in association with the one or more structured data sets (Operation 208). The unstructured data set may be stored in association with a particular structured data set that includes an element that matches a term of the unstructured data set. Additionally or alternatively, the unstructured data set may be stored in association with another structured data set that is associated with the particular structured data set that includes an element that matches a term of the unstructured data set. The unstructured data set may be stored in association with a structured data set in a variety of formats. As an example, the association may be stored in a table, linked list, and/or array. As another example, the unstructured data set may be tagged with a link or pointer to the structured data set. The structured data set may be tagged with a link or pointer to the unstructured data set.

In an embodiment, the data extraction engine determines that a particular term of the unstructured data set matches elements of more than one structured data set. Each structured data set including an element that matches a particular term of the unstructured data set is referred to herein as a "candidate set of structured data sets."

The data extraction engine may use other terms of the unstructured data set to select one of the candidate set of structured data sets as being associated with the unstructured data set. The data extraction engine determines that another term of the unstructured data set matches an element of an additional structured data set. The additional structured data set may be organized according to a schema that is the same as or different from the schema used to organize the candidate set of structured data sets.

The data extraction engine determines that the additional structured data set is associated with a particular structured data set of the candidate set of structured data sets. Based on the determination, the data extraction engine selects the particular structured data set as being associated with the unstructured data set. The data extraction engine stores the unstructured data set in association with the particular structured data set, but does not store the unstructured data set in association with other structured data sets of the candidate set of structured data sets.

As an example, an unstructured data set may include the phrase, "Meeting with Mary Doe of CompanyX." Data Set A and Data Set B may be contact structured data sets organized according to a contact schema. Data Set A and Data Set B may store information corresponding to different persons, both with the name "Mary Doe." Data Set A and Data Set B may each include the element "Mary Doe" under the data field "Name." A data extraction engine may determine a match between (a) the term "Mary Doe" of the unstructured data set, and (b) the element "Mary Doe" of each of the two contact structured data sets. Based on the match, Data Set A and Data Set B would form a candidate set of structured data sets that match the unstructured data set.

Continuing the example, Data Set C may be a company structured data set organized according to a company schema. Data Set C may include the element "CompanyX" under the data field "Company Name." Data Set C may have been previously stored in association with Data Set A, but not Data Set B. The data extraction engine may determine a match between (a) the term "CompanyX" of the unstructured data set, and (b) the element "CompanyX" of the company structured data set. Based on the match, the data extraction engine may store the unstructured data set in association with the company structured data set, Data Set C.

Continuing the example, based on (a) the association between the unstructured data set and Data Set C and (b) the association between Data Set C and Data Set A, the data extraction engine may select Data Set A from the candidate set of structured data sets. The data extraction engine may store the unstructured data set in association with Data Set A, but not in association with Data Set B.

In an embodiment, the data extraction engine determines that a first term of the unstructured data set matches an element of a first structured data set, and that a second term of the unstructured data set matches an element of a second structured data set. The data extraction engine stores the unstructured data set in association with both the first structured data set and the second structured data set. The unstructured data set may be stored in association with the first structured data set and the second structured data set in a variety of formats. The data extraction engine may store a first association between the unstructured data set and the first structured data set and a second association between the unstructured data set and the second structured data set in a table, linked list, and/or array. Additionally or alternatively, the data extraction engine may tag the unstructured data set with links to both the first structured data set and the second structured data set. Additionally or alternatively, the data extraction engine may tag the first structured data set with a link to the unstructured data set, and may tag the second structured data set with a link to the unstructured data set.

Based on determining that a first term of the unstructured data set matches an element of a first structured data set, and that a second term of the unstructured data set matches an element of a second structured data set, the data extraction engine stores an association between the first structured data set and the second structured data set. The first structured data set and the second structured data set may use the same schema or different schemas. As an example, an unstructured data set may include the sentence, "CompanyX is a subsidiary of CompanyY." The term "CompanyX" of the unstructured data set may match a first structured data set. The term "CompanyY" of the unstructured data set may match a second structured data set. The data extraction engine may store the unstructured data set in association with the first structured data set and the second structured data set. The data extraction engine may also store the first structured data set in association with the second structured data set.

In an embodiment, the data extraction engine may concurrently display, at an interface, one or more unstructured data sets and one or more structured data sets that are associated with each other. Displaying an unstructured data set or a structured data set may include displaying all or a subset of the content of the data set, and/or displaying a link that directs a user to all or a subset of the content of the data set.

As an example, an unstructured data set may be stored in association with Structured Data Set A and Structured Data Set B. An interface may concurrently display the unstructured data set and links to Structured Data Set A and Structured Data Set B. As another example, a structured data set may be stored in association with Unstructured Data Set C and Unstructured Data Set D. An interface may concurrently display the structured data set and links to Unstructured Data Set C and Unstructured Data Set D.

One or more embodiments include determining whether there are any modifications to the group of structured data sets (Operation 210). The data extraction engine may monitor the group of structured data sets for any modifications. Additionally or alternatively, an application may notify the data extraction engine when there is a modification to the group of structured data sets.

A modification to the group of structured data sets may include a modification to one of the group of structured data sets. As an example, a group of structured data sets may include a particular structured data set. The particular structured data set may store the element "Laptop" under the data field "Products of Interest," but may not store any information under the data field "Quantity to Be Purchased." Subsequently, the particular structured data set is modified to include "800" under the data field "Quantity to Be Purchased." The modification to the particular structured data set would constitute a modification to the group of structured data sets.

Additionally or alternatively, a modification to the group of structured data sets may include an addition of a particular structured data set to the group of structured data sets and/or a deletion of a particular structured data from the group of structured data sets. As an example, a group of structured data sets may include Structured Data Set A and Structured Data Set B. Subsequently, Structured Data Set C may be added to the group of structured data sets. The addition of Structured Data Set C would constitute a modification to the group of structured data sets.

The data extraction engine may periodically and/or repeatedly determine if there are any modifications to the group of structured data sets. As an example, a data extraction engine may inquire whether there are any modifications once every fifteen minutes. As another example, a data extraction engine may inquire whether there are any modifications whenever the load of the data extraction engine is below a specified threshold.

If there is a modification to the group of structured data sets, then the data extraction engine re-analyzes the unstructured data set based on at least one of the modified group of structured data sets.

In another embodiment, rather than determining if there are any modifications to the group of structured data sets, the data extraction engine periodically re-analyzes the unstructured data set based on a current version of the group of structured data sets. As an example, a data extraction engine may re-analyze the unstructured data set based on a group of structured data sets once every fifteen minutes, without determining whether there are any modifications to the group of structured data sets. As another example, a data extraction engine may re-analyze the unstructured data set based on a group of structured data sets whenever the load of the data extraction engine is below a specified threshold.

In one or more embodiments, analyzing an unstructured data set based on a group of structured data sets improves the usability of the unstructured data set. A user enters an unstructured data set via a user interface without linking the unstructured data set to any existing structured data sets. A data extraction engine determines structured data sets that are associated with the unstructured data set. When the existing structured data sets are modified, the data extraction engine also determines new structured data sets that may be associated with the unstructured data set.

After the associations between structured data sets and unstructured data sets are determined, a user interface concurrently displays an unstructured data set and a set of structured data sets associated with the unstructured data set. Alternatively, a user interface concurrently displays a structured data set and a set of unstructured data sets associated with the structured data set. The concurrent display allows a user to easily identify structured data sets and unstructured data sets that are associated with each other.

Example Embodiment: Storing and Displaying Associations Between an Unstructured Data Set and Structured Data Sets Detailed examples are described below for purposes of clarity. Components and/or operations described below should be understood as specific examples which may not be applicable to certain embodiments. Accordingly, components and/or operations described below should not be construed as limiting the scope of any of the claims.

Figure 3:
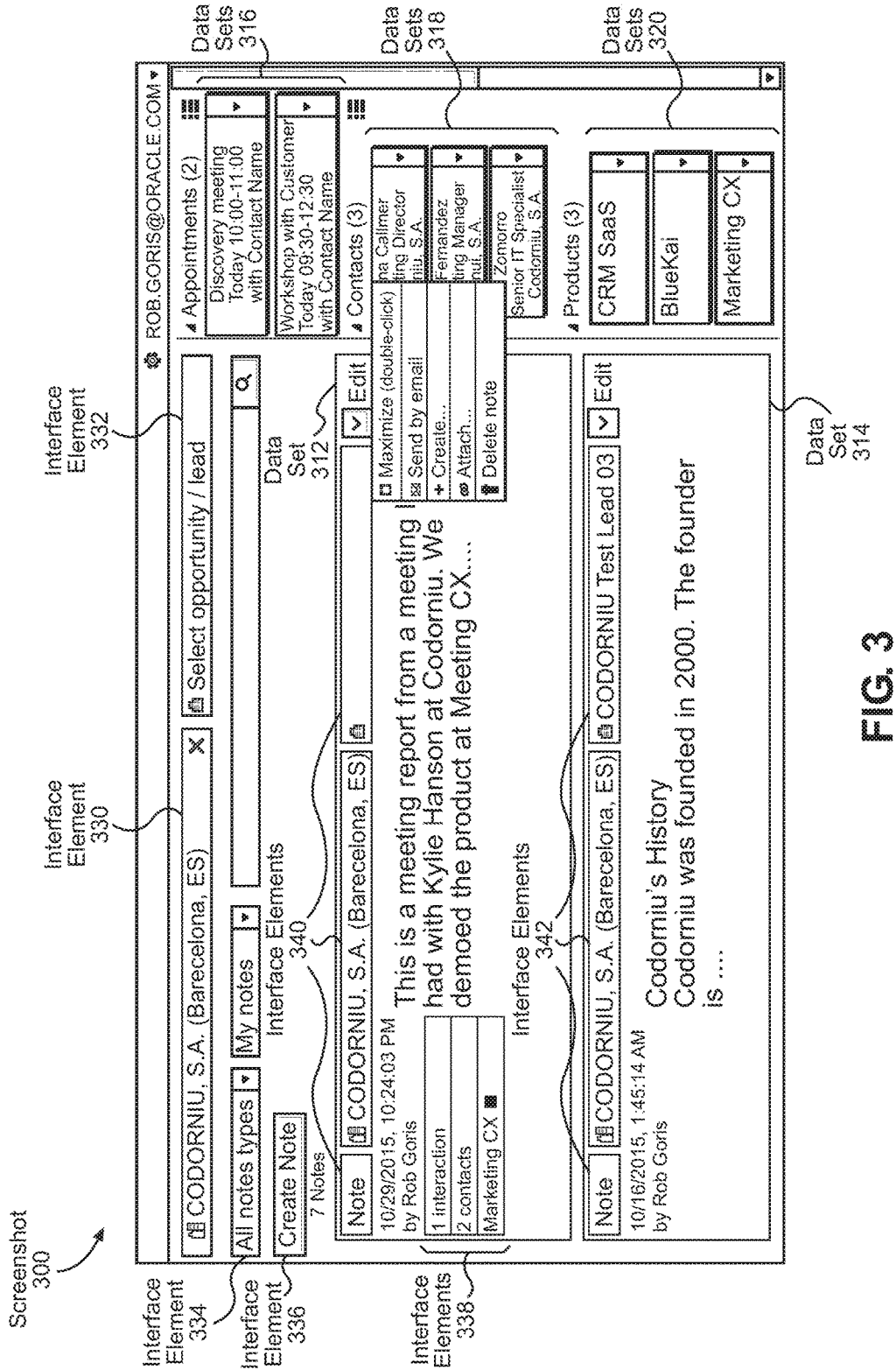
FIG. 3 illustrates an example of associations between an unstructured data set and structured data sets, in accordance with one or more embodiments.

FIG. 3 illustrates an example of associations between an unstructured data set and structured data sets, in accordance with one or more embodiments. As illustrated, screenshot 300 shows unstructured data sets 312-314, structured data sets 316-320, and interface elements 330-342.

A data extraction engine receives unstructured data sets 312-314 via an interface implemented by the data extraction engine. Unstructured data sets 312-314 are note files, which store text, creation date, and author. A user may select interface element 336 to generate a new note file. A user may enter text corresponding to the note file. The data extraction engine stores the note file, including the creation date and the author, in a data repository.

The data extraction engine is configured to index, sort, and search unstructured data sets 312-314. Screenshot 300 shows interface elements 330-334, which accept search criteria for searching unstructured data sets 312-314. Interface element 330 accepts user input selecting a company. Interface element 332 accepts user input selecting an opportunity or lead. Interface element 334 accepts user input selecting a file type corresponding to unstructured data sets. After receiving user input at interface elements 330-334, unstructured data sets matching the user input are displayed at the interface.

As illustrated, "Codorniu, S.A." is selected at interface element 330, no user input is entered at interface element 332, and "All note types" are selected at interface element 334. The data extraction engine determines that unstructured data sets 312-314 match the search criteria and display unstructured data sets 312-314 at an interface.

Interface elements 340 indicates that unstructured data set 312 corresponds to the company "Codorniu, S.A.," and that no opportunity or lead has been identified as corresponding to unstructured data set 312. Interface elements 340 further indicate that unstructured data set 312 is a "Note" file. As illustrated, unstructured data set 312 includes the text, "This is a meeting report from a meeting I had with Kylie Hanson at Codorniu. We demoed the product Marketing CX . . . ."

Interface elements 342 indicates that unstructured data set 314 corresponds to the company "Codorniu, S.A.," and the lead "Codorniu Test Lead 03." Interface elements 342 further indicate that unstructured data set 314 is a "Note" file.

The data extraction engine obtains a group of structured data sets, including structured data sets 316-320, from external applications. Structured data sets 316 store information corresponding to appointments and are organized according to an appointment schema. Structured data sets 316 are obtained from an appointment application. Structured data sets 318 store information corresponding to contact persons and are organized according to a contact schema. Structured data sets 318 are obtained from a contact application. Structured data sets 320 store information corresponding to products and are organized according to a product schema. Structured data sets 320 are obtained from a product application. The data extraction engine obtains structured data sets 316-320 from the applications using Hypertext Transfer Protocol (HTTP).

The data extraction engine is configured to display one or more unstructured data sets and/or structured data sets in different views. Screenshot 300 shows a view focusing on unstructured data sets. Unstructured data sets 312-314 are displayed in a large central region of the interface. Structured data sets 316-320 are displayed in a sidebar. If a user selects structured data sets 316, structured data sets 318, or structured data sets 320, then the view is changed. If structured data sets 316 are selected, then structured data sets 316 are displayed in a large central region of the interface. If structured data sets 318 are selected, then structured data sets 318 are displayed in a large central region of the interface. If structured data sets 320 are selected, then structured data sets 320 are displayed in a large central region of the interface.

The data extraction engine analyzes unstructured data set 312 based on a group of appointment structured data sets, including structured data sets 316. The data extraction engine identifies elements of an appointment structured data set. The appointment structured data set stores an element "meeting" under the data field "Appointment Title," an element "Kylie Hanson" under the data field "Attendees," and an element "Oct. 29, 2015" under the data field "Date." The data extraction engine processes the unstructured data set 312 to identify the terms "meeting" and "Kylie Hanson." The data extraction engine also determines that the term "Oct. 29, 2015" is stored as the "Creation Date" of unstructured data set 312. The data extraction engine compares the elements of the appointment structured data set to the terms of unstructured data set 312.

The data extraction engine determines whether there is an association between unstructured data set 312 and the appointment structured data set. The data extraction engine determines that the term "meeting" from unstructured data set 312 is the same as the element "meeting" from the appointment structured data set. The data extraction engine determines that the term "Kylie Hanson" is the same as the element "Kylie Hanson." The data extraction engine determines that the term "Oct. 29, 2015" is the same as the element "Oct. 29, 2015." Based on the matches between the terms and the elements, the data extraction engine determines that there is a match between unstructured data set 312 and the appointment structured data set. The data extraction engine determines that unstructured data set 312 is associated with the appointment structured data set.

The data extraction engine may repeat the process to analyze unstructured data set 312 based on each of the group of appointment structured data sets. The data extraction engine determines that unstructured data set 312 is associated with one of the group of appointment structured data sets, and stores unstructured data set 312 in association with the matching appointment structured data set.

The data extraction engine analyzes unstructured data set 312 based on a group of contact structured data sets, including structured data sets 318, as described above. The data extraction engine determines whether there is an association between unstructured data set 312 and any of the group of contact structured data sets. The data extraction engine determines that unstructured data set 312 is associated with two contact structured data sets. The data extraction engine stores unstructured data set 312 in association with the two contact structured data sets.

The data extraction engine analyzes unstructured data set 312 based on a group of product structured data sets, including structured data sets 320, as described above. The data extraction engine determines whether there is an association between unstructured data set 312 and any of the group of product structured data sets. The data extraction engine determines that unstructured data set 312 is associated with one product structured data sets. The data extraction engine stores unstructured data set 312 in association with the matching product structured data set.

Based on the stored associations, an interface concurrently displays unstructured data set 312 and the structured data sets associated with unstructured data set 312, including one appointment structured data set, two contact structured data sets, and one product structured data set. As illustrated, screenshot 300 shows unstructured data set 312 and interface elements 338. A box surrounds unstructured data set 312 and interface elements 338, indicating associations between unstructured data set 312 and interface elements 338. Unstructured data set 312 is displayed in a large central region of the box, while interface elements 338 are displayed on one side of the box.

Interface elements 338 include a link labeled "1 interaction," which links to the matching appointment structured data set. Interface elements 338 include a link labeled "2 contacts," which links to the two matching contact structured data sets. Interface elements 338 include a link labeled "Marketing CX," which links to the matching product structured data set. The matching product structured data set stores an element "Marketing CX" under the data field "Product Name."

The data extraction engine determines whether there are any modifications to the group of structured data sets. If so, the data extraction engine re-analyzes unstructured data set 312 based on the modified group of structured data sets. Interface elements 338 may be updated to include one or more links to structured data sets that are newly determined to be associated with unstructured data set 312.

4. Analyzing an Unstructured Data Set Based on One or More Schemas

Figure 4:
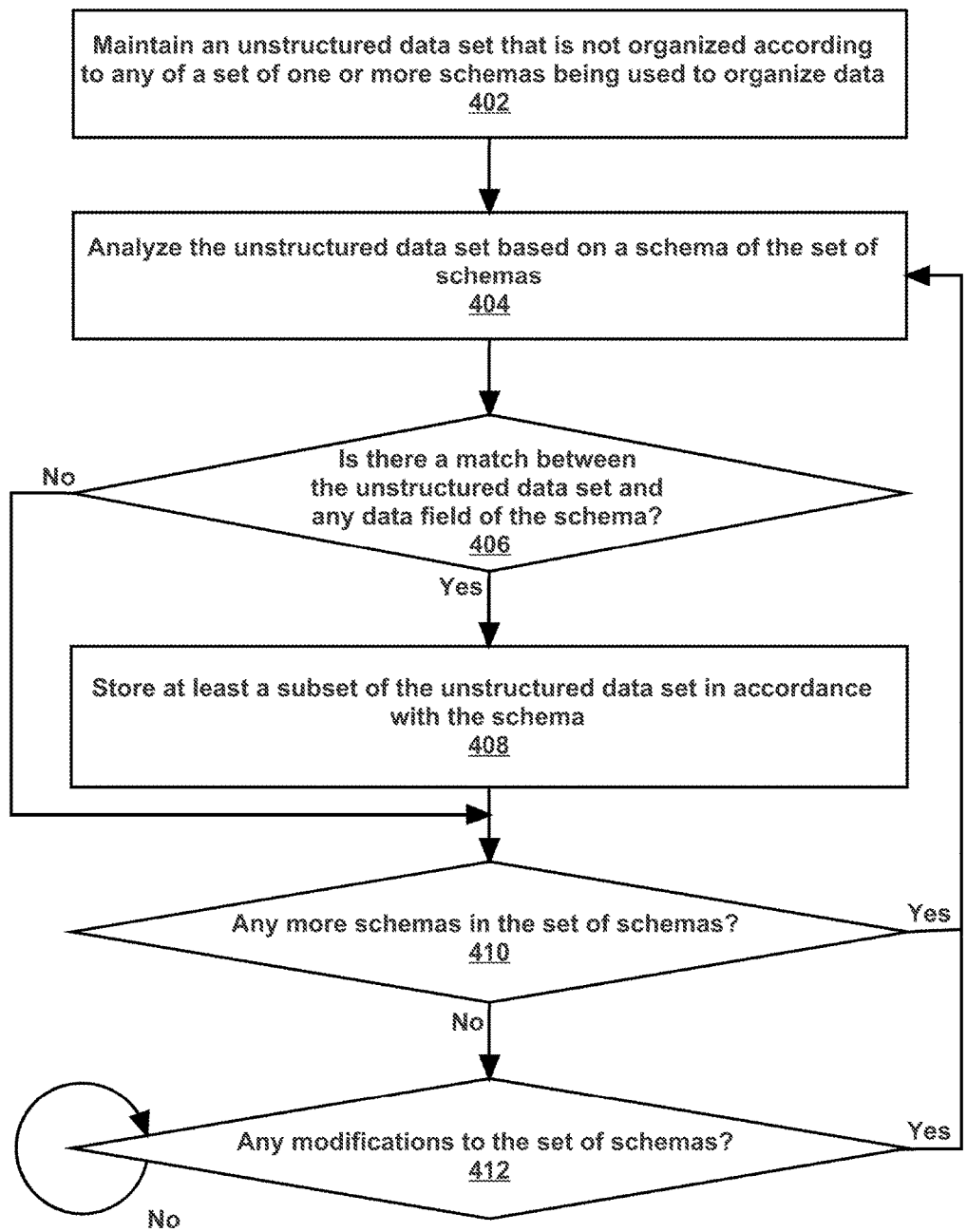
FIG. 4 illustrates an example set of operations for analyzing a particular data set that is not organized according to any of a set of schemas based on one of the set of schemas, in accordance with one or more embodiments.

As mentioned above, in an embodiment, a data extraction engine is configured to perform operations for analyzing an unstructured data set based on a particular schema. The unstructured data set is not organized according to the particular schema. FIG. 4 illustrates an example set of operations for analyzing an unstructured data set that is not organized according to any of a set of schemas being used by a particular system for organizing data, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include maintaining a particular data set not organized according to any of a set of one or more schemas being used by a particular system for organizing data (also referred to herein as an "unstructured data set") (Operation 402). The data extraction engine obtains the unstructured data set from one or more data repositories that are maintained by the data extraction engine and/or one or more other applications, as described above at Operation 202. The data extraction engine maintains the unstructured data set by storing the unstructured data set in one or more particular data repositories. The data extraction engine manages the particular data repositories, including for example controlling access to the particular data repositories, indexing the information stored in the particular data repositories, and performing searches of the information stored in the particular data repositories.

One or more embodiments include analyzing the unstructured data set based on a schema of the set of schemas being used by a particular system to organize data (Operation 404). The data extraction engine may obtain the set of schemas from a set of applications that are in communication with the data extraction engine. Each application may use a different schema, forming the set of schemas. As an example, a data extraction engine may be in communication with a sales application and a contact application. The sales application may use a sales schema, and the contact application may use a contact schema. The data extraction engine may obtain a set of schemas including the sales schema and the contact schema.

The data extraction engine performs natural language processing on the unstructured data set to determine one or more terms of the unstructured data set, as described above at Operation 204. The data extraction engine identifies one or more data fields of a schema of the set of schemas, and identifies one or more rules corresponding to each data field. The data extraction engine may compare all or a subset of terms of the unstructured data set against the rules of all or a subset of data fields of the schema.

As an example, a data field may be "Telephone Number." A rule for the data field may be "7 or 10 consecutive digits." The rule may be expressed as "[dddddd] OR [dddddddddd]," wherein d represents a single digit. A data extraction engine may compare a term of an unstructured data set with the rule to determine whether the term is to be stored as an element under the data field "Telephone Number." As another example, a data field may be "Street Address." A rule for the data field may be a string including a number, followed by text, followed by the word "Street," "Drive," "Avenue," or "Lane." The rule may be expressed as "[number] [text] ['Street' OR 'Drive' OR 'Avenue' OR 'Lane']." A data extraction engine may compare a term of an unstructured data set with the rule to determine whether the term is to be stored as an element under the data field "Street Address." As another example, a data field may be "State." A rule for the data field may be "a string that is the same as one of the names of the fifty states of the United States of America." A data extraction engine may compare a term of an unstructured data set with the rule to determine whether the term is to be stored as an element under the data field "State."

One or more embodiments include determining whether there is a match between the unstructured data set and any data field of the schema (Operation 406). The data extraction engine determines whether one or more terms of the unstructured data set satisfies the rules of one or more data fields of the schema. If the rules are satisfied, then the data extraction engine determines that there is a match between the unstructured data set and the data fields of the schema.

As an example, a data field of a schema may be "Telephone Number." A rule for the data field may be "7 consecutive digits (excluding symbols)." An email may be stored as an unstructured data set. The email may include a sentence, "She is 30 years old." The email may also include a footer, stating "John Smith|Electronics Corp.|123-4567." A data extraction engine may identify "30" and "123-4567" as terms of the unstructured data set. The data extraction engine may analyze the term "30" based on the rule. Since the term "30" does not include 7 consecutive digits, the rule would not be satisfied. The data extraction engine may analyze the term "123-4567" based on the rule. The term "123-4567" includes 7 consecutive digits, excluding the symbol "-". The rule would be satisfied. The data extraction engine may determine that there is match between the unstructured data set and the data field "Telephone Number" of the schema.

If there is a match between the unstructured data set and one or more data fields of the schema, then the data extraction engine stores at least a subset of the unstructured data set in accordance with the schema (Operation 408). The data extraction engine extracts at least a subset of information from the unstructured data set. The data extraction engine organizes the extracted information according to the schema, by storing a subset of information that matches a particular data field of the schema under the particular data field. The data extraction engine generates a structured data set organized according to the schema, which stores the extracted information according to the schema.

As an example, a schema may include the data fields "Name," "Company," and "Address." An unstructured data set may include the following text, "I spoke with Abigail Dickson of CompanyY. Abigail works in the Arizona office." The term "Abigail Dickson" may match the data field "Name." The term "CompanyY" may match the data field "Company." The term "Arizona" may match the data field "Address." Based on the matches between the terms and the data fields, the data extraction engine may extract the terms "Abigail Dickson," "CompanyY," and "Arizona" from the unstructured data set. The data extraction engine may store the extracted terms in a structured data set organized according to the schema. "Abigail Dickson" may be stored under the data field "Name," "CompanyY" may be stored under the data field "Company," and "Arizona" may be stored under the data field "Address."

Optionally, prior to storing the subset of the unstructured data set in accordance with the schema as a structured data set, the data extraction engine displays an organization of the subset of the unstructured data set in accordance with the schema at an interface. The data extraction engine receives user input confirming, editing, and/or rejecting the organization of the subset of the unstructured data set in accordance with the schema. The data extraction engine stores the subset of the unstructured data set as a structured data set, using the organization that has been confirmed and/or edited by the user input.

One or more embodiments include determining whether there are any more schemas, in the set of schemas, that have not yet been used to analyze the unstructured data set (Operation 410).

If there are more schemas in the set of schemas, then the data extraction engine analyzes the unstructured data set based on an additional schema in the set of schemas (Operation 404). The data extraction engine determines whether there is a match between the unstructured data set and any data field of the additional schema (Operation 406). If there is a match, then the data extraction engine stores at least a subset of the unstructured data set in accordance with the additional schema (Operation 408). The data extraction engine determines again whether there are any more schemas in the set of schemas (Operation 410).

In an embodiment, Operations 404-410 are repeated with respect to each schema in the set of schemas. The data extraction engine analyzes the unstructured data set based on each schema in the set of schemas. The data extraction engine may extract different subsets of information from the unstructured data set based on the different schemas that are used. The data extraction engine stores each subset of the unstructured data set in a different structured data set organized according to a different schema.

One or more embodiments include determining whether there are any modifications to the set of schemas (Operation 412). The data extraction engine may monitor the set of schemas for any modifications. Additionally or alternatively, an application may notify the data extraction engine when there is a modification to the set of schemas.

A modification to the set of schemas may include a modification to a particular schema of the set of schemas. A modification to a particular schema may be a modification, addition, and/or deletion of a data field of the particular schema. As an example, a schema, in a set of schemas, may include the data fields "Product," "Quantity," and "Total Amount." A data extraction engine may analyze one or more unstructured data sets based on the set of schemas. Subsequently, the data field named "Total Amount" may be modified to be named "Revenue." An additional data field, "Date," may be added. The modified schema would include the data fields "Product," "Quantity," "Revenue," and "Date." The modification to the schema would constitute a modification to the set of schemas.

Additionally or alternatively, a modification to the set of schemas may include an addition of a particular schema to the set of schemas and/or a removal of a particular schema from the set of schemas. As an example, the data extraction engine may be in communication with a set of applications. Each application may use different schemas, forming a set of schemas. The data organization may analyze one or more unstructured data sets based on the set of schemas. Subsequently, a new application may be added to the set of applications that are in communication with the data extraction engine. One or more schemas used by the new application may be added to the set of schemas. The addition of the new schemas would constitute a modification of the set of schemas.

The data extraction engine may periodically or continuously determine whether there any modifications to the set of schemas.

If there is a modification to the set of schemas, then the data extraction engine re-analyzes the unstructured data set based on at least one modified schema.

In another embodiment, rather than determining whether there are any modifications to the set of schemas, the data extraction engine periodically re-analyzes the unstructured data set based on a current version of the set of schemas. As an example, a data extraction engine may re-analyze the unstructured data set once every fifteen minutes, without determining whether there are any modifications to the set of schemas. As another example, a data extraction engine may re-analyze the unstructured data set whenever the load of the data extraction engine is below a specified threshold.

Optionally, one or more embodiments include storing associations corresponding to a structured data set that is extracted from an unstructured data set. The data extraction engine may store the unstructured data set in association with an extracted structured data set. Additionally or alternatively, the data extraction engine may store one structured data set extracted from the unstructured data set in association with another structured data set extracted from the unstructured data set. The two structured data sets extracted from the unstructured data set may be organized according to the same or different schemas.

In one or more embodiments, analyzing an unstructured data set based on one or more schemas allows structured data sets to be automatically generated based on the unstructured data set. A user enters the unstructured data set via a user interface without being concerned about the specific data fields used by the schemas. A data extraction engine generates one or more structured data sets from the unstructured data set. The structured data sets may be used by one or more applications to store, index, archive, or otherwise manage the data extracted from the unstructured data set.

Example Embodiment: Storing and Updating
Structured Data Sets from an Unstructured Data Set Detailed examples are described below for purposes of clarity. Components and/or operations described below should be understood as specific examples which may not be applicable to certain embodiments. Accordingly, components and/or operations described below should not be construed as limiting the scope of any of the claims.

Figure 5A:
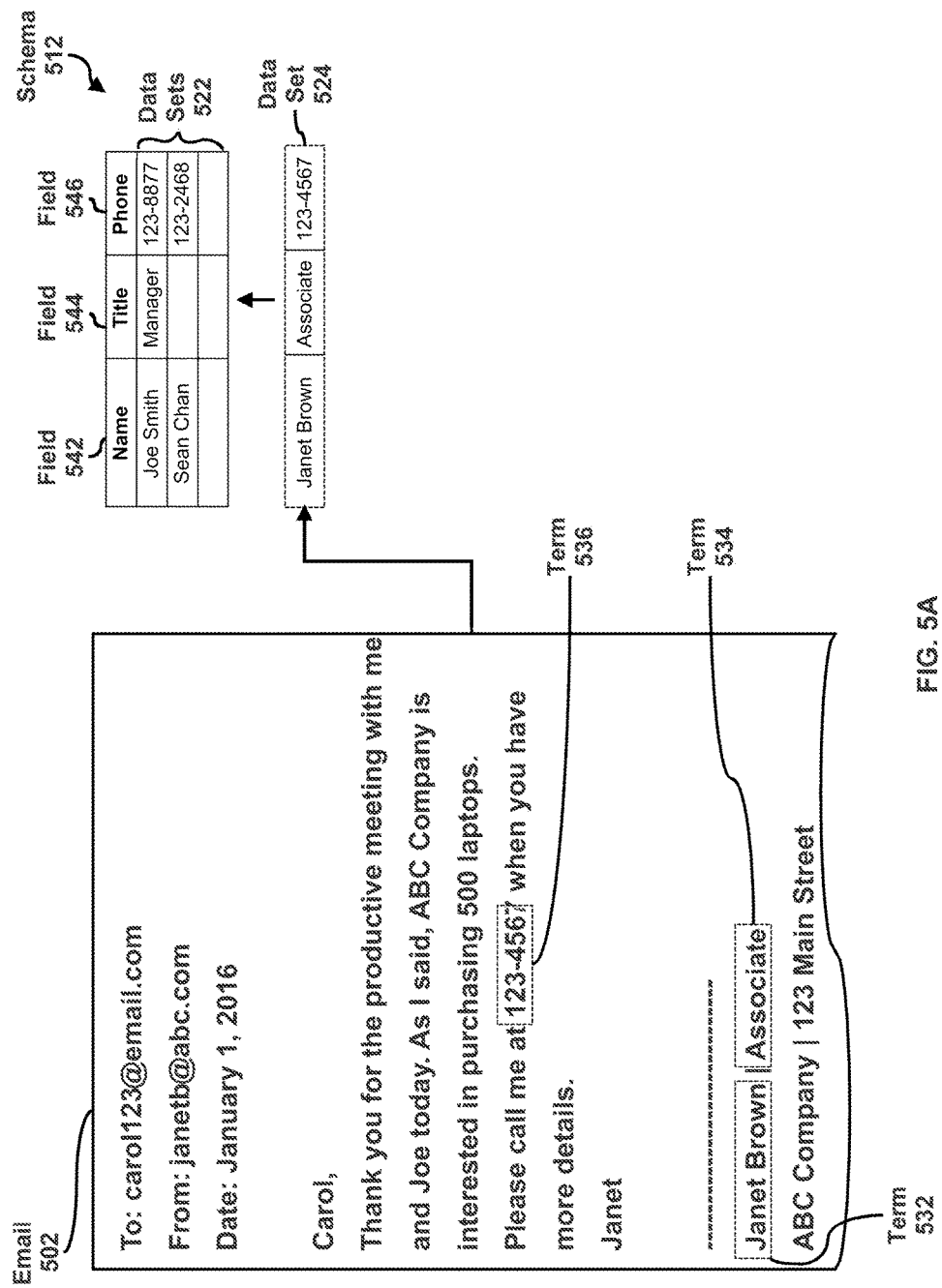
FIGS. 5A and 5B illustrate an example of structured data sets that are stored and updated from an unstructured data set, in accordance with one or more embodiments.
Figure 5B:
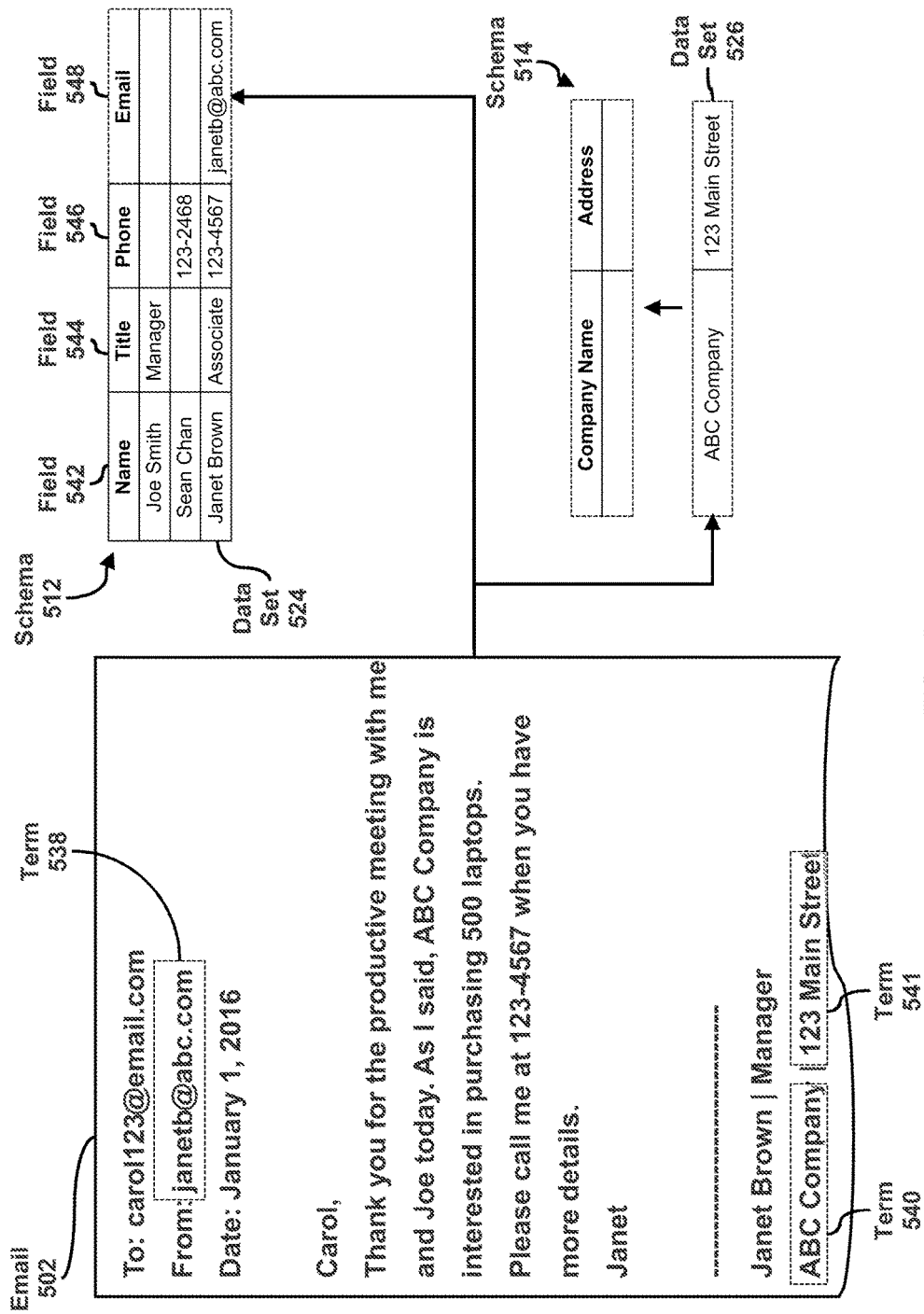

FIGS. 5A and 5B illustrate an example of structured data sets that are stored and updated from an unstructured data set, in accordance with one or more embodiments.

Referring to FIG. 5A, a data extraction engine is in communication with a contact application, which uses contact schema 512. The contact application stores structured data sets 522 in accordance with contact schema 512. A set of schemas that are being used by applications that are in communication with the data extraction engine includes contact schema 512.

The data extraction engine identifies data fields 542-546 of contact schema 512. The data extraction engine also identifies rules corresponding to each of data fields 542-546. Data field 542 is named "Name." A rule for data field 542 is that a term includes two or more consecutive capitalized words. Data field 544 is named "Title." A rule for data field 544 is that a term appears next to another term that satisfies a rule for data field 542. Data field 546 is named "Phone." A rule for data field 546 is that a term has 7 consecutive digits.

The data extraction engine receives email 502, which is a data set that is not organized according to contact schema 512. The data extraction engine analyzes email 502 based on contact schema 512. The data extraction engine processes email 502 to identify terms 532-536. Term 532 is "Janet Brown," term 534 is "Associate," and term "536" is "123-4567."

The data extraction engine determines whether there is a match between email 502 and any data field of contact schema 512. The data extraction engine analyzes terms 532-536 based on the rules corresponding to data fields 542-546. Term 532, "Janet Brown," includes two consecutive capitalized words. Term 532 satisfies the rule corresponding to data field 542. Term 534, "Associate," appears next to term 532, which satisfies the rule corresponding to data field 542. Term 534 satisfies the rule corresponding to data field 544. Term 536, "123-4567," includes seven consecutive digits. Term 536 satisfies the rule corresponding to data field 546. The data extraction engine determines that there is a match between email 502 and data field 542-546 of contact schema 512.

The data extraction engine stores at least a subset of email 502 in accordance with contact schema 512. The data extraction engine extracts terms 532-536 from email 502. The data extraction engine stores the extracted terms 532-536 in a structured data set 524. As illustrated, term 532 is stored under data field 542, term 534 is stored under data field 544, and term 536 is stored under data field 546.

The data extraction engine determines that there are no other schemas in the set of schemas. The data extraction engine determines whether there are any modifications to the set of schemas.

At a later time, the set of schemas are modified. Referring to FIG. 5B, data field 548 is added to contact schema 512. Data field 548 is named "Email." A rule corresponding to data field 548 is that a term includes the symbol "@" and ends with ".com" or ".org".

In addition, a company application is now in communication with the data extraction engine. The company application uses a company schema 514. Hence, company schema 514 is added to the set of schemas that are used by applications that are in communication with the data extraction engine. Company schema includes the data fields "Company Name" and "Address." A rule corresponding to the data field "Company Name" is a capitalized word followed by the word "Company," "Limited," or "Corporation." A rule corresponding to the data field "Address" is a number, followed by text, followed by the word "Street," "Drive," "Road," or "Avenue."

The data extraction engine re-analyzes email 502 based on contact schema 512 of the modified set of schemas. The data extraction engine processes email 502 to identify terms 532-536 as well as term 538, which is "janetb@abc.com."

The data extraction engine determines whether there is a match between email 502 and any data field of the modified contact schema 512. The data extraction engine analyzes term 538 based on the rules corresponding to data field 548. Term 538, "janetb@abc.com," includes the symbol "@" and ends with ".com". Term 538 satisfies the rule corresponding to data field 548. The data extraction engine determines that there is a match between email 502 and data fields 542-548 of contact schema 512.

The data extraction engine stores at least a subset of email 502 in accordance with the modified contact schema 512. The data extraction engine extracts terms 532-538 from email 502. The data extraction engine stores the extracted terms 532-538 in a modified structured data set 524. As illustrated, term 532 is stored under data field 542, term 534 is stored under data field 544, term 536 is stored under data field 546, and term 538 is stored under data field 548.

The data extraction engine determines that email 502 has not yet been analyzed based on company schema 514. The data extraction engine analyzes email 502 based on company schema 514. The data extraction engine processes email 502 to identify terms 540-542. Term 540 is "ABC Company," and term 541 is "123 Main Street."

The data extraction engine determines whether there is a match between email 502 and any data field of company schema 514. The data extraction engine analyzes terms 540-542 based on the rules corresponding to the data fields of company schema 514. Term 540, "ABC Company," includes a capitalized word followed by the word "Company." Term 540 satisfies the rule corresponding to the "Company" data field. Term 541, "123 Main Street," includes a number, followed by text, followed by the word "Street." Term 541 satisfies the rules corresponding to the "Address" data field. The data extraction engine determines that there is a match between email 502 and the data fields of company schema 514.

The data extraction engine stores at least a subset of email 502 in accordance with company schema 514. The data extraction engine extracts terms 540-542 from email 502. The data extraction engine stores the extracted terms 540-542 in a structured data set 526. As illustrated, term 540 is stored under the "Company" data field, and term 541 is stored under the "Address" data field.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
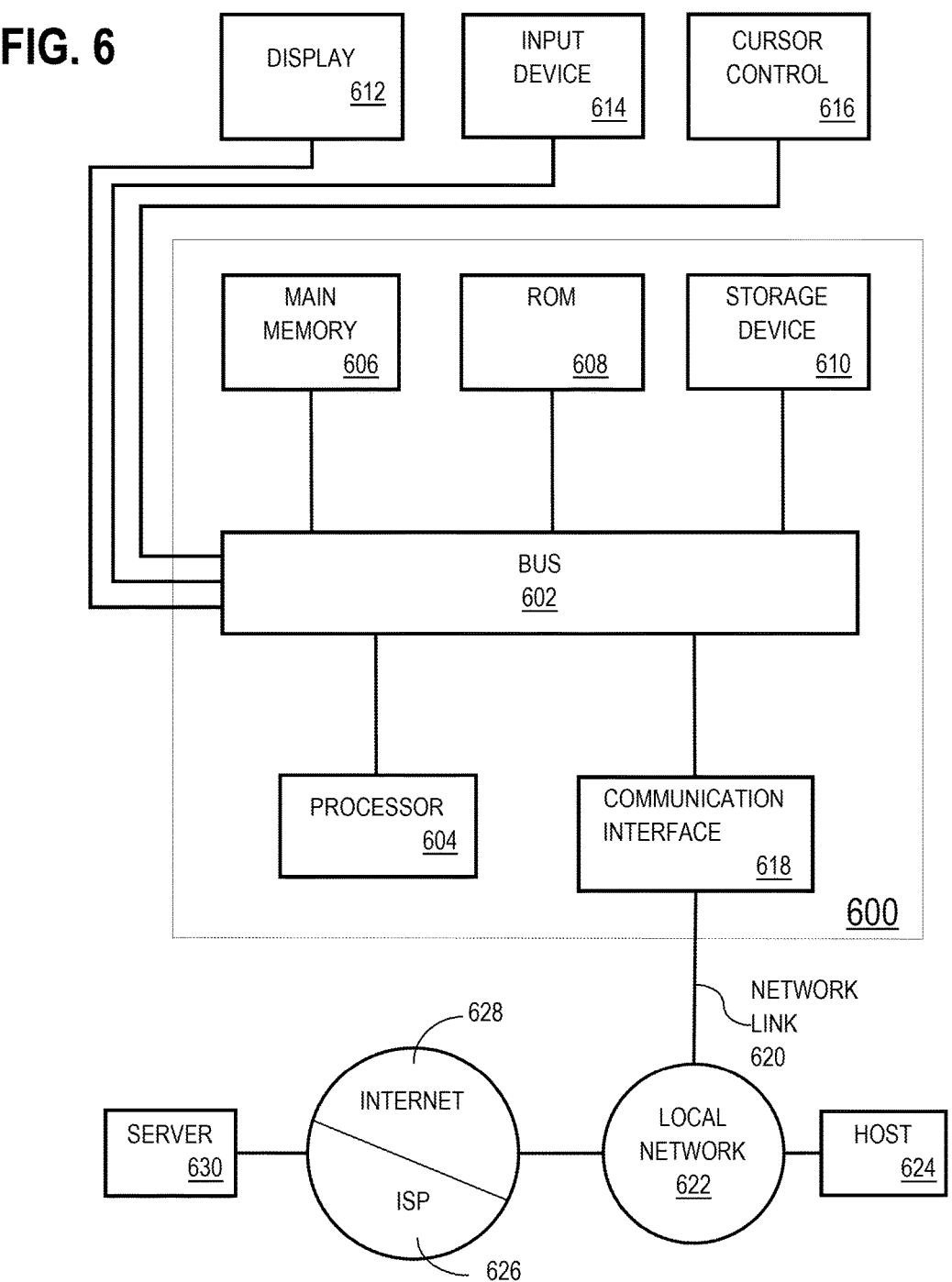
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    obtaining, from a set of one or more data repositories, a plurality of structured data sets organized according to a first schema;
    obtaining, from the set of data repositories, a particular data set that is not organized according to the first schema;
    traversing the plurality of structured data sets, comprising:
        identifying a respective element of each of the plurality of structured data sets for comparison against the particular data set;
        comparing at least a subset of the particular data set to the respective element of each of the plurality of structured data sets;
    based on comparing the subset of particular data set to a first element of a first structured data set of the plurality of structured data sets: determining a match between the subset of the particular data set and the first element of the first structured data set of the plurality of structured data sets;
    wherein determining the match between the subset of the particular data set and the first element of the first structured data set comprises: determining that a similarity score between the subset of the particular data set and the first element of the first structured data set is above a threshold value;
    responsive to determining the match, generating information indicating an association between the first structured data set and the particular data set;
    storing, in the set of data repositories, the information indicating the association between the first structured data set and the particular data set; and
    based at least on the stored information indicating the association between the first structured data set and the particular data set, concurrently presenting the first structured data set and the particular data set at an interface.

2. The medium of claim 1, wherein the particular data set is an unstructured data set.

3. The medium of claim 1, wherein the particular data set is organized according to a second schema different than the first schema.

4. The medium of claim 1, wherein the operations further comprise:
    analyzing the particular data set based on a second schema to identify a second subset of the particular data set that corresponds to a data field of the second schema; and
    storing the second subset of the particular data set in accordance with the second schema.

5. The medium of claim 1, wherein the operations further comprise:
    storing at least the subset of the particular data set, in the first structured data set, in accordance with the first schema.

6. The medium of claim 5, wherein the operations further comprise:
    prior to storing at least the subset of the particular data set in accordance with the first schema:
        presenting an organization of the subset of the particular data set in accordance with the first schema at the interface; and
        receiving user input confirming the organization of the subset of the particular data set in accordance with the first schema.

7. The medium of claim 1, wherein the operations further comprise:
    determining that a second structured data set, organized according to a second schema different than the first schema, is associated with the first structured data set;
    based on determining that the second structured data set is associated with the first structured data set, determining that the second structured data set is associated with the particular data set; and
    storing the particular data set further in association with the second structured data set.

8. The medium of claim 1, wherein generating the information indicating the association between the first structured data set and the particular data is further responsive to:
    (a) determining that the subset of the particular data set matches each of a candidate set of structured data sets of the plurality of structured data sets, the candidate set of structured data sets comprising the first structured data set;
    (b) determining that the particular data set is associated with a second structured data set organized according to a second schema different than the first schema;
    (c) determining that the second structured data set is associated with the first structured data set of the candidate set of structured data sets; and
    responsive to (a), (b), and (c), determining that the first structured data set is associated with the particular data set.

9. The medium of claim 1, wherein the operations further comprise:
subsequent to a modification of the plurality of structured data sets to generate a modified plurality of structured data sets:
re-analyzing the particular data set, not organized according to the first schema, based on at least one of the modified plurality of structured data sets;
based on re-analyzing the particular data set, determining that a second structured data set, of the modified plurality of structured data sets, is associated with the particular data set; and
storing the particular data set in association with the second structured data set.

10. The medium of claim 9, wherein the modification of the plurality of structured data sets comprises a modification of the first structured data set to generate the second structured data set.

11. The medium of claim 9, wherein the modification of the plurality of structured data sets comprises an addition of the second structured data set, different than the first structured data set, to the plurality of structured data sets.

12. The medium of claim 9, wherein re-analyzing the particular data set comprises: analyzing the particular data set based on a new structured data set that was added to the plurality of structured data sets.

13. The medium of claim 1, wherein:
the particular data set is an unstructured data set; and
the operations further comprise: concurrently displaying the unstructured data set and the first structured data set at the interface.

14. The medium of claim 1, wherein:
the particular data set is an unstructured data set;
generating the information indicating the association between the first structured data set and the particular data is further responsive to:
(a) determining that the subset of the particular data set matches each of a candidate set of structured data sets of the plurality of structured data sets, the candidate set of structured data sets comprising the first structured data set;
(b) determining that the particular data set is associated with a second structured data set organized according to a second schema different than the first schema;
(c) determining that the second structured data set is associated with the first structured data set of the candidate set of structured data sets; and
responsive to (a), (b), and (c), determining that the first structured data set is associated with the particular data set;
the operations further comprise:
presenting an organization of the subset of the particular data set in accordance with the first schema at an interface;
receiving user input confirming the organization of the subset of the particular data set in accordance with the first schema;
responsive to receiving the user input: storing the subset of the particular data set, in the first structured data set, in accordance with the first schema;
analyzing the particular data set based on a second schema to identify a second subset of the particular data set that corresponds to a data field of the second schema;
storing the second subset of the particular data set, in a second structured data set, in accordance with the second schema;
determining that the first structured data set is associated with a third structured data set that is organized according to a third schema different than the first schema;
based on determining that the first structured data set is associated with the third structured data set, determining that the particular data set is associated with the third structured data set;
storing the particular data set further in association with the third structured data set;
subsequent to a modification of the plurality of structured data sets to generate a modified plurality of structured data sets:
re-analyzing the particular data set, not organized according to the first schema, based on at least one of the modified plurality of structured data sets;
based on re-analyzing the particular data set, determining that a fourth structured data set, of the modified plurality of structured data sets, is associated with the particular data set; and
storing the particular data set in association with the fourth structured data set.

15. A method, comprising:
obtaining, from a set of one or more data repositories, a plurality of structured data sets organized according to a first schema;
obtaining, from the set of data repositories, a particular data set that is not organized according to the first schema;
traversing the plurality of structured data sets, comprising:
identifying a respective element of each of the plurality of structured data sets for comparison against the particular data set;
comparing at least a subset of the particular data set to the respective element of each of the plurality of structured data sets;
based on comparing the subset of particular data set to a first element of a first structured data set of the plurality of structured data sets: determining a match between the subset of the particular data set and the first element of the first structured data set of the plurality of structured data sets;
wherein determining the match between the subset of the particular data set and the first element of the first structured data set comprises: determining that a similarity score between the subset of the particular data set and the first element of the first structured data set is above a threshold value;
responsive to determining the match, generating information indicating an association between the first structured data set and the particular data set;
storing, in the set of data repositories, the information indicating the association between the first structured data set and the particular data set; and
based at least on the stored information indicating the association between the first structured data set and the particular data set, concurrently presenting the first structured data set and the particular data set at an interface;
wherein the method is performed by at least one hardware device including a processor.

16. A system, comprising:
at least one hardware device including a processor; and the system configured to perform operations comprising:
obtaining, from a set of one or more data repositories, a plurality of structured data sets organized according to a first schema;
obtaining, from the set of data repositories, a particular data set that is not organized according to the first schema;
traversing the plurality of structured data sets, comprising:
- identifying a respective element of each of the plurality of structured data sets for comparison against the particular data set;
- comparing at least a subset of the particular data set to the respective element of each of the plurality of structured data sets;

based on comparing the subset of particular data set to a first element of a first structured data set of the plurality of structured data sets: determining a match between the subset of the particular data set and the first element of the first structured data set of the plurality of structured data sets;
wherein determining the match between the subset of the particular data set and the first element of the first structured data set comprises: determining that a similarity score between the subset of the particular data set and the first element of the first structured data set is above a threshold value;
responsive to determining the match, generating information indicating an association between the first structured data set and the particular data set;
storing, in the set of data repositories, the information indicating the association between the first structured data set and the particular data set; and
based at least on the stored information indicating the association between the first structured data set and the particular data set, concurrently presenting the first structured data set and the particular data set at an interface.

17. A non-transitory computer readable medium comprising instructions which, when executed by one or more hardware processors, causes performance operations comprising:
maintaining a particular data set not organized according to any schema of a set of one or more schemas;
analyzing the particular data set based on a first schema of the set of schemas;
storing a first subset of the particular data set in accordance with the first schema;
analyzing the particular data set based on a second schema, different than the first schema, of the set of schemas;
storing a second subset of the particular data set in accordance with the second schema;
subsequent to a modification of the first schema to generate a modified schema that is different from the first schema and the second schema:
re-analyzing the particular data set based on the modified schema;
storing a third subset of the particular data set in accordance with the modified schema;
wherein the modification to the first schema comprises an addition of a new field to the first schema; and
wherein storing the third subset of the particular data set in accordance with the modified schema comprises: determining that the third subset of the particular data set corresponds to the new field.

18. The medium of claim 17, wherein the operations further comprise:
presenting the first subset of the particular data set in accordance with the first schema at an interface;
subsequent to the modification of the first schema to generate the modified schema: presenting the third subset of the particular data set in accordance with the modified schema at the interface.

19. A non-transitory computer readable medium comprising instructions which, when executed by one or more hardware processors, causes performance of operations comprising:
obtaining, from a set of one or more data repositories, a plurality of structured data sets organized according to a first schema;
obtaining, from the set of data repositories, a particular data set that is not organized according to the first schema;
traversing the plurality of structured data sets, comprising:
- identifying a respective element of each of the plurality of structured data sets for comparison against the particular data set;
- comparing at least a subset of the particular data set to the respective element of each of the plurality of structured data sets;

based on comparing the subset of particular data set to a first element of a first structured data set of the plurality of structured data sets: determining a match between the subset of the particular data set and the first element of the first structured data set of the plurality of structured data sets;
responsive to determining the match, generating information indicating an association between the first structured data set and the particular data set;
storing, in the set of data repositories, the information indicating the association between the first structured data set and the particular data set;
based at least on the stored information indicating the association between the first structured data set and the particular data set, concurrently presenting the first structured data set and the particular data set at an interface;
analyzing the particular data set based on a second schema to identify a second subset of the particular data set that corresponds to a data field of the second schema; and
storing the second subset of the particular data set in accordance with the second schema.

* * * * *

UNITED STATES PATENT AND TRADEMARK OFFICE
CERTIFICATE OF CORRECTION

PATENT NO. : 10,303,704 B2
APPLICATION NO. : 15/051296
DATED : May 28, 2019
INVENTOR(S) : Goris et al.

Page 1 of 1

It is certified that error appears in the above-identified patent and that said Letters Patent is hereby corrected as shown below:

In the Specification

In Column 1, Line 4, below "ORGANIZING DATA" insert -- TECHNICAL FIELD
The present disclosure relates to processing data sets. In particular, the present disclosure relates to processing a data set that is not organized according to a schema being used for organizing data. --.

Signed and Sealed this
Twenty-eighth Day of July, 2020

Andrei Iancu
*Director of the United States Patent and Trademark Office*